United States Patent
French

(10) Patent No.: US 12,330,072 B2
(45) Date of Patent: Jun. 17, 2025

(54) ROULETTE WHEEL READING APPARATUS

(71) Applicant: TCS JOHN HUXLEY EUROPE LIMITED, Stoke on Trent (GB)

(72) Inventor: Nicholas Richard Baker French, Stoke on Trent (GB)

(73) Assignee: TCS JOHN HUXLEY EUROPE LIMITED, Stoke on Trent (GB)

( * ) Notice: Subject to any disclaimer, the term of this patent is extended or adjusted under 35 U.S.C. 154(b) by 310 days.

(21) Appl. No.: 17/797,390

(22) PCT Filed: Dec. 16, 2020

(86) PCT No.: PCT/GB2020/053226
§ 371 (c)(1),
(2) Date: Aug. 3, 2022

(87) PCT Pub. No.: WO2021/156591
PCT Pub. Date: Aug. 12, 2021

(65) Prior Publication Data
US 2023/0084418 A1 Mar. 16, 2023

(30) Foreign Application Priority Data
Feb. 4, 2020 (GB) .................................... 2001493

(51) Int. Cl.
*A63F 5/00* (2006.01)
*A63F 9/24* (2006.01)
*G01S 17/06* (2006.01)

(52) U.S. Cl.
CPC ............ *A63F 5/0005* (2013.01); *G01S 17/06* (2013.01); *A63F 2009/2445* (2013.01)

(58) Field of Classification Search
CPC ................................ A63F 5/0005; G01S 17/06
See application file for complete search history.

(56) References Cited

U.S. PATENT DOCUMENTS 5,836,583 A 11/1998 Towers
5,879,235 A 3/1999 Kaneka et al.
(Continued)

OTHER PUBLICATIONS

International Preliminary Report on Patentability on PCT Appl. Serial. No. PCT/GB2020/053226 dated Jul. 28, 2022 (7 pages).

*Primary Examiner* — Yingchuan Zhang
(74) *Attorney, Agent, or Firm* — Foley & Lardner LLP

(57) ABSTRACT

A roulette wheel reading apparatus is provided for triangulating a roulette ball position in a pocket of a roulette wheel. The apparatus comprises: a triangulation sensor, a roulette wheel position sensor, and a processor; wherein the triangulation sensor comprises: a first signal emitter arranged to emit a first signal toward a location within a pocket of a roulette wheel comprising a plurality of roulette wheel pockets; and a second signal emitter arranged to emit a second signal toward the location; wherein the triangulation sensor further comprises: a signal receiver positioned to receive a first reflection of the first signal at a first receipt time and arranged to output the first receipt time, the signal receiver being further positioned to receive a second reflection of the second signal at a second receipt time and arranged to output the second receipt time; wherein the first reflection and the second reflection originate from said roulette ball; the roulette wheel position sensor being arranged to detect and output a position of one or more of the plurality of roulette wheel pockets relative to the location; the processor being arranged to: receive the first receipt time, the second receipt time and the position; calculate a time difference between the first receipt time and the second receipt time; identify that the time difference is within a predetermined time difference threshold; identify, using the position, the pocket of the roulette wheel; and output the pocket of the roulette wheel as a roulette result. The apparatus of the present invention aims to accurately and reliably (Continued)

identify cessation of a roulette ball in a roulette wheel pocket for the purpose of informing the reporting of a winning roulette result.

15 Claims, 3 Drawing Sheets

(56) References Cited

U.S. PATENT DOCUMENTS

2009/0174141 A1 7/2009 Witty
2010/0301556 A1 12/2010 Kido

ROULETTE WHEEL READING APPARATUS

CROSS-REFERENCE TO RELATED APPLICATION

This application is a U.S. National Phase Application of the PCT Application No. PCT/GB2020/053226, filed on Dec. 16, 2020, which is based upon a Great Britain Application No. 2001493.2, filed on Feb. 4, 2020, the entire contents of each of which are incorporated herein by reference.

FIELD OF THE INVENTION

The present invention relates to a roulette wheel reading apparatus, and particularly to a roulette wheel reading apparatus arranged to identify a pocket of a roulette wheel in which a roulette ball has ceased moving.

BACKGROUND TO THE INVENTION

Roulette wheels are becoming increasingly automated and monitored in order to limit time spent resetting and carrying out jackpot payments. Many online forms of roulette are driven by a real-world roulette wheel which is used to provide an online graphical user experience with non-pseudorandom results in as non-biased and non-exploitable a fashion as possible.

Automated roulette wheels can provide enormous benefits in the form of improved reliability, speed of play and maximising the length and number of play opportunities for a player. Automated systems can suffer inherent drawbacks, however, which often require human intervention to rectify. One critical problem with automated roulette wheels is the frequency of incorrect identifications of a winning roulette result.

A roulette wheel typically comprises a sensor arranged to detect a roulette ball in a pocket of the roulette wheel, requiring a number of rotations of the roulette wheel before the sensor is able reliably conclude that the ball remains stationary in a pocket and a winning result can be called. In order to increase the length and frequency of play for players, table operators can often struggle to balance the risk of generating an incorrect result with the reward of generating said result in as few rotations of the roulette wheel as possible. A large number of rotations enables relative certainty of the result but provides considerably fewer play opportunities per unit time; while a small number of rotations can maximise play opportunities, while running the risk that the ball may continue to move once the winning result has been called and jackpots are paid.

In an automated system it is difficult to account for the near-infinite number of possible trajectories a roulette ball can take, and anomalous events which may occur due to rare combinations of highly-infrequent circumstances. Increasing the number of plays by automating processes can cause otherwise infrequent occurrences to become more frequent.

One such anomalous event is a "rim rider", wherein the ball travels about the wheel bowl at speed roughly equivalent to the speed of rotation of the wheelhead, such that the resulting inertia of the roulette ball and the rotational speed of the wheelhead enable the roulette ball to sit above the pocket and spin. While a sensor may detect that the ball has ceased to move, the ball may move between pockets as the spin speed reduces.

Other problematic events can include when a roulette ball descends the bowl with too much momentum, bounces through a pocket and up the cone.

Misreads as a result of such events can cause major issues particularly when the roulette wheel is used either online or is connected to electronic gaming machines, as once the winning result is declared, or has been issued to a client device, all pay-outs are typically carried out.

It is therefore desirable to provide a solution which overcomes the disadvantages of the current. Particularly, it is desirable to provide a roulette wheel reading apparatus and method which minimises the time taken to reliably identify a winning roulette result and overcomes a number of known anomalous events which cause misreads, while maximising the frequency of potential play experiences for a user.

SUMMARY OF THE INVENTION

In accordance with a first aspect of the present invention, there is provided a roulette wheel reading apparatus for triangulating a roulette ball position in a pocket of a roulette wheel, the apparatus comprising: a triangulation sensor, a roulette wheel position sensor, and a processor; wherein the triangulation sensor comprises: a first signal emitter arranged to emit a first signal toward a location within a pocket of a roulette wheel comprising a plurality of roulette wheel pockets; and a second signal emitter arranged to emit a second signal toward the location; wherein the triangulation sensor further comprises: a signal receiver positioned to receive a first reflection of the first signal at a first receipt time and arranged to output the first receipt time, the signal receiver being further positioned to receive a second reflection of the second signal at a second receipt time and arranged to output the second receipt time; wherein the first reflection and the second reflection originate from said roulette ball; the roulette wheel position sensor being arranged to detect and output a position of one or more of the plurality of roulette wheel pockets relative to the location; the processor being arranged to: receive the first receipt time, the second receipt time and the position;

calculate a time difference between the first receipt time and the second receipt time; identify that the time difference is within a predetermined time difference threshold; identify, using the position, the pocket of the roulette wheel; and output the pocket of the roulette wheel as a roulette result.

The present solution aims to triangulate a roulette ball using a triangulation sensor in order to determine more accurately if the roulette ball has ceased moving within a pocket region of the roulette wheel, and therefore avoids a false detection of a roulette result when the ball is still moving or if the ball's inertia is causing it to rotate about the wheel on a fixed position of the rotating wheelhead other than in a pocket. For example, the ball may be stationary on the rotating wheelhead, fixed in place on the numbered portion or rim of the wheelhead (commonly termed a "rim rider"), or may have bounced up the cone. In current versions of roulette wheel reading technology, such activity by the ball may be incorrectly interpreted as a positioning of the ball into a pocket of the wheelhead.

In accordance with the invention, a triangulation sensor, having two or more signal emitters directed toward a location within a pocket region of the roulette wheel, preferably enables the present invention to provide an accurate and reliable determination of when a ball stationary on the rotating wheelhead is located in a pocket. The two or more signal emitters are preferably directed toward a common location, the respective signals preferably being directed in a corresponding direction such that the signals fall incident upon a roulette ball located at a precise position within the roulette wheel (a pocket of the roulette wheel). The precise position is determined according to respective receipt times of reflections corresponding to each respective signal emitted, said determination occurring only when said receipt times are located within an acceptable predetermined time threshold from one another. In most preferable embodiments, the respective receipt times are the same, or substantially the same, time.

In preferable embodiments, said signal emitters are preferably positioned to direct their corresponding signals toward the location within a pocket region of the roulette wheel in a corresponding direction. In preferable embodiments said corresponding directions are different to one another.

Without such triangulation using current technology, and therefore using only a single signal reflection to identify roulette ball cessation, it remains possible for an incorrect identification of location of cessation of the roulette ball to be made (for example on the numbered region, rim or cone of the wheelhead), and an incorrect winning result of the roulette game to therefore be called. In order to maximise ability to detect correctly-located cessation of the ball with such current technology, multiple revolutions of the roulette wheel are required, thereby increasing the time taken for a correct roulette result to be called. Additionally, using such technology, there are multiple factors which could result in a miss-read of the roulette wheel, such as the presence of "rim riders" (where the inertia of the roulette ball and the speed of rotation of the wheelhead enable the ball to sit above the pocket and spin in a single location) or when the roulette ball bounces through a pocket and up the cone of the wheelhead. A misread can result in issues when the roulette wheel is used to provide results for online gambling or is connected to electronic gaming machines, since once a result has been output to customers, all pay-outs of jackpots are typically carried out automatically.

It is appreciable that an increased number of roulette wheel reading apparatuses according to the first aspect may result in a greater number of corresponding reflections representing the roulette ball being detected and tracked at various positions along the rotational arc of the wheelhead, and thereby preferably permit more reliable determination of said correctly-located cessation of movement, and following which an accurate and reliable winning result may swiftly be called either automatically or by a table operator following correct identification of said winning result by the invention, or by a computer utilising the invention.

It is preferable for each of the two or more signal emitters to be positioned such that their corresponding reflections are received by only a single receiver. In preferable embodiments therefore the apparatus comprises only a single signal receiver per at least two signal emitters. For the purpose of the present invention, using the same time reference for determining the first receipt time and the second receipt time is preferably beneficial for accurate calculations of the time difference, and for reliable comparisons to be made between the time difference and the predetermined time threshold. For time-sensitive tasks such as the determination of an accurate roulette result, multiple signal receivers may each use a corresponding time reference for determination of receipt times or a time/duration of flight of a signal. As an imperfect system, clocks invariably lose synchronicity over time. As such, having a single receiver using a single time-reference for determination of the first and second receipt times, and subsequently the time difference, is key to the accurate, reproducible and efficient determination of a correct roulette result.

In preferable embodiments the single signal receiver is positioned at a receiver location, the receiver location being a location in a plane about a wheel bowl of the roulette wheel. The first signal emitter and the second signal emitter are preferably positioned at a first emitter location and a second emitter location respectively, the first and second emitter locations being a location in the plane about the wheel bowl, wherein the receiver location, the first emitter location and the second emitter location are different. Preferably the receiver location and the first emitter location are spaced from each other in the plane about the wheel bowl by a first separation distance. Preferably the receiver location and the second emitter location are spaced from each other in the plane about the wheel bowl by a second separation distance. Suitable first separation distance and the second separation distance will be appreciated. It will be understood that, in embodiments wherein the receiver location, the first emitter location and the second emitter location are located on a common plane about the wheel bowl, the corresponding separation distances are measured about an arc defined by the wheel bowl in said common plane.

The apparatus preferably further comprises a memory, and wherein the processor is arranged to store on the memory at least one of: the first receipt time; the second receipt time; the position; the pocket as a roulette result. The processor is preferably arranged to access the first and second receipt times in order to compare the first and second receipt times to identify the time difference. The first and second receipt times may be respectively comprised within first and second detection files, which may additionally comprise first or second reflection data, the first or second reflection data comprising data characteristic of the first or second reflection respectively. The first or second reflection data may comprise data indicating the source of the first or second reflection, thereby indicating whether the first or second reflection originated from the roulette ball. The processor may analyse the first or second reflection data prior to comparing the first and second receipt times, in order to determine that the first and/or second reflection indeed originated from the roulette ball. For example, roulette balls may comprise a reflectivity measure, said reflectivity measure providing a reflection having known reflection properties. The first or second reflection data may be analysed by the processor for identification of said reflection properties, thereby indicating if the first or second reflection originated from the roulette ball. In some embodiments, the processor is arranged to carry out a comparison of the first and second receipt times following correct identification of said reflective properties.

The apparatus preferably further comprises a display screen in digital communication with the processor, and wherein the display screen is arranged to display an indication of the pocket as a roulette result. In some embodiments, the display screen may be arranged to display an indication of one of the plurality of roulette wheel pockets according to said comparison of the first and second receipt times. The display screen may act as an indication to a table operator that the roulette ball has ceased moving, and thereby indicate to said table operator that it is safe to call the corresponding roulette result—being one of the plurality of roulette wheel pockets of the pocket region. The display screen may further (or instead) act as an indication to a table operator, or to one or more roulette players, the roulette result itself—according to one of the plurality of roulette wheel pockets of the pocket region in which the roulette ball remains stationary.

In some embodiments, the display screen may preferably be arranged to display a series of indications of previous roulette results. As such, the display screen may in such embodiments provide an indication to one or more table operators or players of roulette, the previous roulette results. Using the present invention, such a display of previous roulette results is feasible since the improved accuracy provided by the present invention in identifying a roulette result preferably minimises any likelihood of incorrect results being stored and displayed, which would thereby provide incorrect result-tracking information for table operators or players who may each be looking to identify trends in the results of the roulette wheel. In the case of players, any trends may be exploited, whereas for table operators, any trends in results may indicate a fault with the roulette wheel, triggering ceasing of play for review, repair or maintenance; or perhaps even indicate foul play.

In preferable embodiments, first signal emitter and the second signal emitter are arranged to emit a signal having a signal type selected from the group: acoustic; infrared; near infrared; ultraviolet; any suitable region of the electromagnet spectrum. Preferably the signal receiver is arranged to receive a signal having the signal type. Preferably the first signal emitter and the second signal emitter are optical emitters.

The first signal emitter is preferably arranged to emit the first signal in a first direction toward the location, and the second signal emitter is preferably arranged to emit the second signal in a second direction toward the location, wherein the first direction and the second direction are different. The first signal emitter and the second signal emitter are therefore preferably positioned to direct their respective first and second signals toward the location from different origins. In preferable embodiments, the first signal describes a first signal trajectory in the first direction, and the second signal preferably describes a second signal trajectory in the second direction, wherein the first signal trajectory and the second signal trajectory intersect to describe an angle therebetween, the angle being selected from the range: 0° to 90°. In most preferable embodiments, the angle is selected from the range: 5° to 25°. Suitable angles will be appreciated. The angle is preferably provided in order to direct the corresponding reflections from each of the first and second signals toward the common signal receiver. The first reflection preferably describes a first reflection trajectory toward the signal receiver, and the second reflection preferably describes a second reflection trajectory toward the signal receiver, wherein the first reflection trajectory and the second reflection trajectory are coincident. In some embodiments, the first reflection trajectory from the ball to the signal receiver, and the second reflection trajectory from the ball to the signal receiver may have an angle defined therebetween, the angle providing for propagation of each corresponding reflection toward the common signal receiver.

The location in the pocket region, to which the first and second signal are directed, is preferably positioned such that when a roulette ball is present on the location, a first flight path is defined by the sum travel distance of the first signal from the first signal emitter to the roulette ball and the first reflection from the roulette ball to the signal receiver. The location is further preferably positioned such that when a roulette ball is present on the location, a second flight path is defined by the sum travel distance of the second signal from the second signal emitter to the roulette ball and the second reflection from the roulette ball to the signal receiver. Preferably the first travel distance and the second travel distance are the same.

In preferable embodiments, the time taken for the first signal to travel to the roulette ball and for the first reflection to travel to the signal receiver is the first time of flight; and the time taken for the second signal to travel to the roulette ball and for the second reflection to travel to the signal receiver is the second time of flight, wherein the first time of flight and the second time of flight are known. In preferable embodiments, the first time of flight and the second time of flight are the same.

The predetermined time threshold, in preferable embodiments, may provide for slight movements in the positioning of the first signal emitter, the second signal emitter or the signal receiver relative to each other or the location, such that the present apparatus continues to function following minor movement, deterioration or warping of structural components of roulette wheels which may be common In such preferable embodiments, the first time difference and the second time difference are compared when the first time difference is equal to the first time of flight, and the second time difference is equal to the second time of flight.

The roulette wheel position sensor is arranged to detect and output a roulette wheel position. The processor is arranged to receive the roulette wheel position, and further arranged to use the roulette wheel position in combination with the first and second receipt times, and/or the time difference, to determine the pocket and therefore a winning roulette result. When the processor identifies that the time difference is within the predetermined time threshold, the processor is preferably then able to access the position of the roulette wheel and determine from said position the pocket of the plurality of pockets in which the roulette ball has ceased moving, and thereby identify a winning roulette result.

In some embodiments, it may be the case that the predetermined time threshold of differences between the first receipt time and the second receipt time causes the processor to identify the pocket. Such embodiments may account for miniscule movements of components over time, which may be the case in wooden roulette wheels which can experience some small deformation and shape changes in different humidity/moisture environments. In such embodiments, the first signal emitter, the second signal emitter and/or the signal receiver may be located in, or in close proximity to, wooden components or surfaces of the roulette wheel, and therefore be subject to potential subtle adjustments in position over time. Any adjustments in position may affect the overall first or second time of flight and thereby cause a comparison of the first and second receipt times by the processor to incorrectly fail to determine the pocket. In such embodiments, it may be beneficial for a predetermined threshold range either side of a desired time difference between the first receipt time and the second receipt time to be sufficient to identify a roulette ball at the correct location. In some preferable embodiments, the predetermined time threshold will be zero, or approximately zero, such that the time difference is expected to be zero, or close to zero. In other embodiments, the time threshold may be, for example 0 to 500 milliseconds. Any suitable time threshold will be appreciated.

The apparatus preferably further comprises one or more additional signal emitters, each of the additional signal emitters being arranged to emit a corresponding additional signal toward the location. The signal receiver is preferably arranged to receive a corresponding reflection of each additional signal at a corresponding receipt time. In preferable embodiments, said corresponding reflection originates from the roulette ball. In such embodiments the processor is preferably able to calculate a corresponding time difference between each corresponding receipt time, for comparison.

In accordance with a second aspect of the present invention there is provided a roulette wheel comprising a roulette wheel bowl and a roulette wheel wheelhead, the roulette wheel wheelhead having a circumferential pocket region comprising a plurality of pockets, the roulette wheel further comprising a roulette wheel reading apparatus comprising: a triangulation sensor, a roulette wheel position sensor, and a processor; wherein the triangulation sensor comprises: a first signal emitter arranged to emit a first signal toward a location within a pocket of a roulette wheel comprising a plurality of roulette wheel pockets; and a second signal emitter arranged to emit a second signal toward the location; wherein the triangulation sensor further comprises: a signal receiver positioned to receive a first reflection of the first signal at a first receipt time and arranged to output the first receipt time, the signal receiver being further positioned to receive a second reflection of the second signal at a second receipt time and arranged to output the second receipt time; wherein the first reflection and the second reflection originate from said roulette ball; the roulette wheel position sensor being arranged to detect and output a position of one or more of the plurality of roulette wheel pockets relative to the location; the processor being arranged to: receive the first receipt time, the second receipt time and the position; calculate a time difference between the first receipt time and the second receipt time; identify that the time difference is within a predetermined time difference threshold; identify, using the position, the pocket of the roulette wheel; and output the pocket of the roulette wheel as a roulette result.

In preferable embodiments of a roulette wheel in accordance with the second aspect of the invention, the roulette wheel reading apparatus is preferably a roulette wheel reading apparatus in accordance with the first aspect. As such, any features described in relation to the first aspect will be appreciated to be compatible with a roulette wheel in accordance with the second aspect.

Preferably the first and second signal emitters are positioned at fixed points on the roulette wheel.

A roulette wheel in accordance with the second aspect of the present invention may comprise one or more roulette wheel reading apparatuses in accordance with the first aspect, each said apparatus positioned about the wheel bowl at a known distance apart.

When the rotation speed of the wheelhead is also, such embodiments preferably enable advantageous detection of both of: when a roulette ball is detected in the pocket region of the roulette wheel (using a first roulette result output from a first roulette wheel reading apparatus); and, to confirm that the ball location has not changed in the distance pocket region of the roulette wheel has rotated at the rotation speed (using a first roulette result output from a first roulette wheel reading apparatus).

Such quicker and more reliable detection of a winning roulette result preferably provides for a more reliable roulette wheel, which preferably avoids delays while a roulette wheel is reset or while mis-payments of jackpots are rectified as a result of an incorrect identification of a roulette wheel result.

Thereby, if the roulette ball remains in place during rotation of the pocket region between the first point and the second point (preferably having a known separation distance therebetween), a comparison of the first time difference and the second time difference preferably equals zero, indicating that a roulette number corresponding to the pocket in which the roulette ball has ceased moving is a winning roulette result.

When the first time difference is equal to (or in some embodiments, approximately equal to) the known first time of flight, an assumption can be made that the roulette ball is in the corresponding spot of the pocket region. The processor is arranged to calculate the first time difference. If the processor identifies that the first time difference is equal to (or in some embodiments, approximately equal to) the first time of flight, the processor is preferably arranged to output a detection signal. In such embodiments, the detection signal is arranged to actuate the second signal emitter to emit the second signal at a known second emission time, the known second emission time following the first emission time by a known time interval. Said known time interval preferably corresponds to a separation distance between the first point and the second point (and may correspond to a known speed of rotation of a wheelhead of the roulette wheel), wherein if the detected roulette ball has ceased moving in a pocket of the pocket region, the second time difference calculated by the second receipt time will be known.

When the second time difference is equal to (or in some embodiments, approximately equal to) the known second time of flight, an assumption can be made that the roulette ball remains unmoved in the corresponding spot of the pocket region. As such, by comparing first time difference and the second time difference, the processor is preferably arranged to identify that the roulette ball has ceased moving in the pocket region of the roulette wheel.

In accordance with a third aspect of the present invention, there is provided a method of triangulating a roulette ball position in a pocket of a roulette wheel, the method comprising the steps of:

emitting, by a first signal emitter, a first signal toward a location within a pocket of a roulette wheel comprising a plurality of roulette wheel pockets;

emitting, by a second signal emitter, a second signal toward the location;

receiving, by a signal receiver, a first reflection of the first signal at a first receipt time and arranged to output the first receipt time;

receiving, by the signal receiver, a second reflection of the second signal at a second receipt time and arranged to output the second receipt time;

calculating a time difference between the first receipt time and the second receipt time;

identifying that the time difference is within a predetermined time difference threshold;

identifying, using the position, the pocket of the roulette wheel; and outputting the pocket of the roulette wheel as a roulette result.

In some preferable embodiments, the method further comprises the steps of:

storing, by a memory, the pocket as a roulette result.

In some further preferable embodiments, the method further comprises the step of:

displaying, by a display screen, an indication of the pocket as a roulette result.

It will be appreciated that the method of the third aspect may be performed by a roulette wheel reading apparatus in accordance with the first aspect or a roulette wheel in accordance with the second aspect. As such, any features described herein in relation to the first or second aspects will be understood to also be suitable for a method of the third aspect.

DETAILED DESCRIPTION

Specific embodiments will now be described by way of example only, and with reference to the accompanying drawings, in which.

Figure 1:
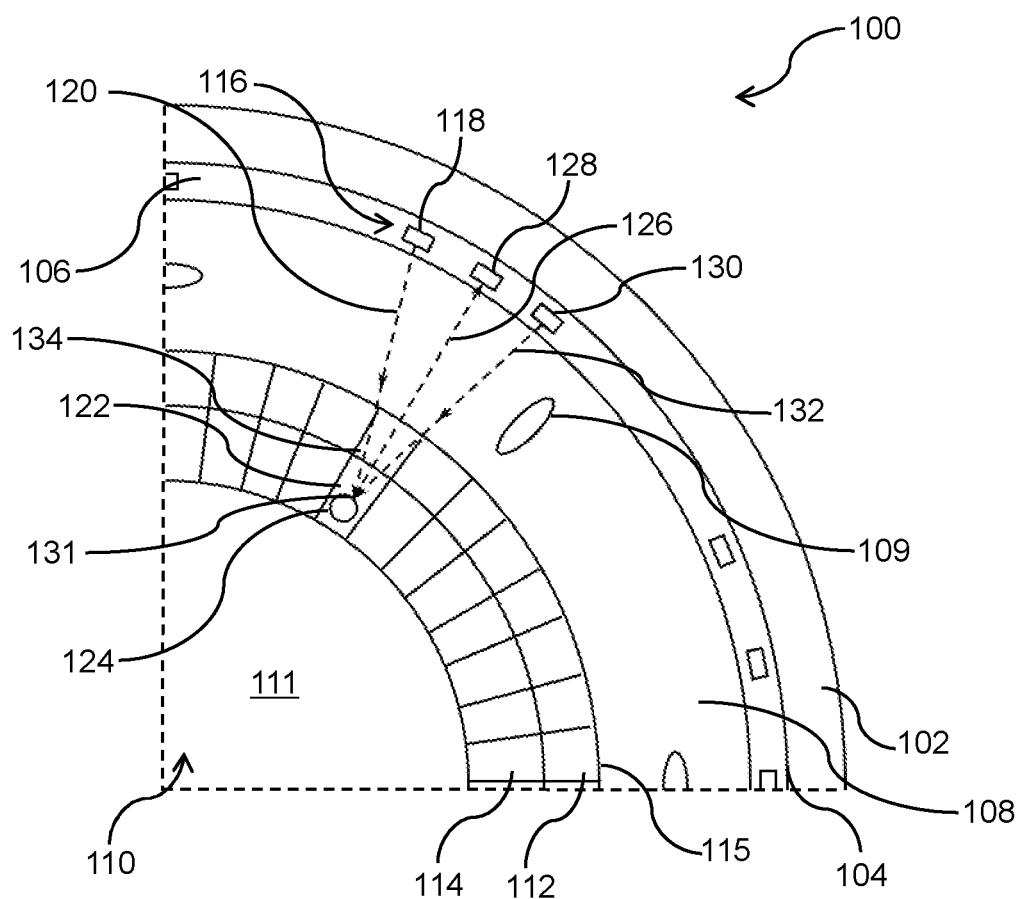
FIG. 1 shows a cutaway plan view of an example embodiment of a roulette wheel in accordance with the second aspect comprising a roulette wheel reading apparatus in accordance with the first aspect, the roulette wheel having a roulette ball located in a pocket thereof.

Referring to FIG. 1, a cutaway plan view of an example embodiment 100 of a roulette wheel in accordance with the second aspect is shown comprising a roulette wheel reading apparatus 116 in accordance with the first aspect. In the example 100 shown, the roulette wheel 100 is an automated roulette wheel. The roulette wheel 100 comprises a wheel bowl having a rim 102 defining a circumference of the wheel bowl. Positioned beneath the rim 102 and describing a circumferential path thereabout is a groove 104 within the wheel bowl, the groove 104 forming a ball track 104. Positioned immediately beneath the ball track 104 and adjacent thereto is a sensor strip 106 extending about the wheel bowl. In the example 100 shown the sensor strip 106 comprises a plurality of sensors arranged to detect various positional data about elements of the roulette wheel 100. Extending downwards from the ball track 104 and sensor strip 106 is a sloped portion of the wheel bowl forming the roulette wheel apron 108. The surface of the apron 108 forms a negative gradient from the ball track 104 toward the centre of the wheel bowl. Protruding upwardly from the apron 108 are a series of ball deflectors 109 distributed about the apron 108.

Located at the centre of the wheel bowl and extending vertically therefrom is a spindle (not shown). Supported on the spindle and arranged to rotate relative thereto is a wheelhead 110 comprising a central cone 111. The wheelhead 110 engages the spindle by ball bearings (not shown), permitting rotation of the wheelhead relative to the spindle and bowl.

Radiating outwardly from the cone 111 of the wheelhead is a number and pocket portion defining a plurality of possible results of a roulette game, the number and pocket portion comprising a plurality of numbered regions 112 forming an outermost edge 115 of the wheelhead 110, each numbered region 112 comprising a corresponding pocket region 114 extending inwardly therefrom. In the example shown, adjacent pocket regions 114 are separated by vertical frets defining vertical boundaries of said pocket regions 114. The numbered regions 112 form a continuous annular edge 115 of the wheelhead 110. When the wheelhead 110 is in place on the spindle as shown in FIG. 1, the edge 115 formed by the numbered portions 112 extends proximate to the corresponding edge of the apron 108 and any gap therebetween is minimised such that an approximately continuous surface between the apron 108 and the numbered regions 112 is formed. In the example shown, in order to permit smooth rotation of the wheelhead 110 relative to said apron 108, the outer edge 115 in use does not make contact with the corresponding edge of the apron 108. Some embodiments may be appreciated wherein a low-friction contact between the edge 115 and the apron 108 may be permitted.

The sensor strip 106 comprises an example roulette wheel reading apparatus 116 in accordance with the first aspect of the present invention. The apparatus 116 comprises a triangulation sensor and a processor (not shown). The triangulation sensor comprises a first signal emitter 118 arranged to emit a first signal 120 at a first emission time and in a first direction toward a pocket region 114 of the roulette wheel 100. The triangulation sensor further comprises a second signal emitter 130 arranged to emit a second signal 132 at a second emission time in a second direction toward the pocket region 114 of the roulette wheel 100. The first signal emitter 118 is positioned on the sensor strip 106 such that the first signal 120 is directed toward a location 131 on the pocket region 114. The second signal emitter 130 is positioned on the sensor strip 106 such that the second signal 132 is directed toward the location 131 on the pocket region 114. The triangulation sensor further comprises a signal receiver 128 positioned to receive a first reflection 126 of the first signal 120 at a first receipt time and arranged to output the first receipt time, the signal receiver being further positioned to receive a second reflection 126 of the second signal at a second receipt time and arranged to output the second receipt time.

The apparatus further comprises a position detector (not shown) arranged to detect and output a position of the wheelhead of the roulette wheel along a rotation arc of said wheelhead. The processor is arranged to receive the position of the wheelhead and use said position to determine the location of each of a plurality of pockets of the pocket region 114 and their corresponding numbers of the number region 112.

The processor is further arranged to receive the first and second receipt times from the signal receiver 128. The processor is then arranged to calculate a time difference between the first receipt time and the second receipt time. The processor is then arranged to compare the time difference to a known time threshold, which in the embodiment shown is zero. If the time difference is within the time threshold, the processor acknowledges that the roulette ball 124 has been detected in a pocket 122. The processor is then arranged to obtain the roulette wheel position from the position detector in order to identify the number 134 of the pocket 122 and output the number 134 as a winning roulette result.

In the embodiment 100 shown the first signal emitter and the second signal emitter are positioned equidistant from the location 131, such that the first signal and the second signal are emitted simultaneously. Additional embodiments may be appreciated wherein the positioning of the first signal emitter and the second signal emitter causes staggered emitting of their respective signals in order for the corresponding reflections to the be received by the signal receiver within the predetermined time threshold, which is preferably zero.

Figure 2:
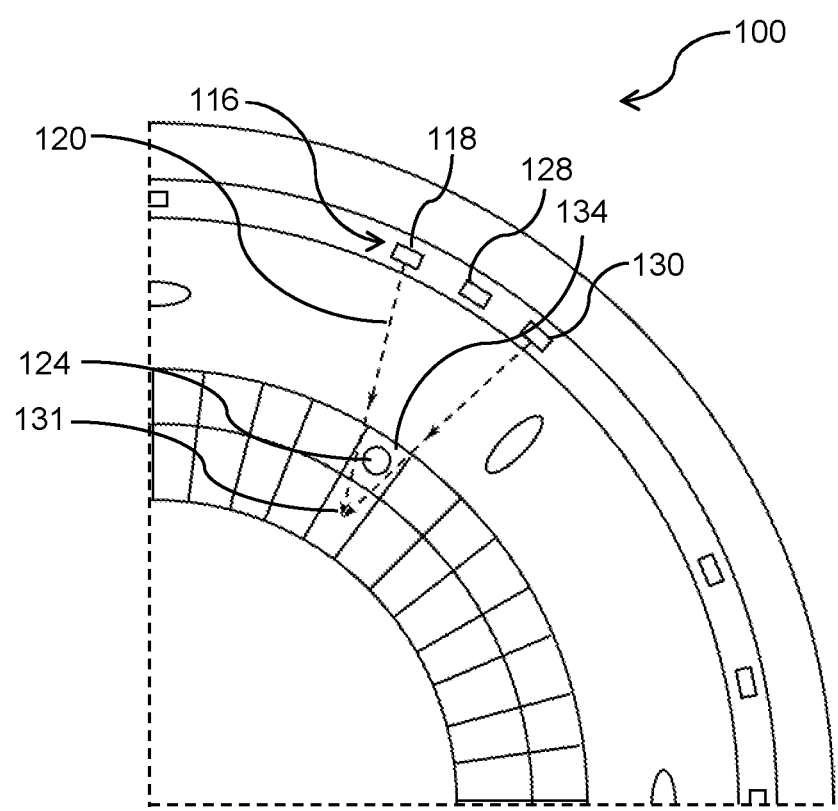
FIG. 2 shows a cutaway plan view of the roulette wheel of FIG. 1 having a roulette ball exhibiting "rim rider" behaviour.

FIG. 2 shows an identical embodiment 100 to FIG. 1, wherein the roulette ball 124 is stationary on the numbered region 112 of the wheelhead 110 such that no reflection of the first signal or the second signal are directed to the signal receiver, and no roulette result is subsequently called.

The embodiment of FIG. 1 and FIG. 2 further comprises a display screen (not shown) arranged to display the winning roulette result to a plurality of players of roulette.

In the embodiment shown in FIG. 1 and FIG. 2, the first signal emitter 118 and the second signal emitter 130 are light emitters, and in particular are one or more infra-red LEDs arranged to emit their corresponding first and second signals 120, 132 as collimated beams of infra-red light at a common point 131 on the pocket region 112. When a roulette ball (generally having a reflective surface) passes said common point, the first and second signals 120, 132 are reflected toward the single signal receiver 128. The signal receiver 128 comprises a plurality of photodiodes arranged in a linear array for receiving the reflected first and second signal 126. Other embodiments will be appreciated having any suitable signal emitters and receiver.

Having two or more of said signal emitters in sequence per receiver, to direct a signal toward the pocket region and reflected to the receiver, preferably enables the present invention to perform rapid calculation of when the ball is detected in a pocket, followed by a rapid, reliable and reproducible confirmation that the ball is present in the pocket region and has not changed pockets in the distance the cylinder has turned. The more apparatuses added the faster the result will be called. Having each of the signals arranged to detect a ball in a pocket rather than located on frets, on the numbered region, or on the cone preferably enables the present invention to avoid false positives created by anomalous and stochastic roulette ball events which pose problems in present technologies, such as "rim-riders".

Figure 3:
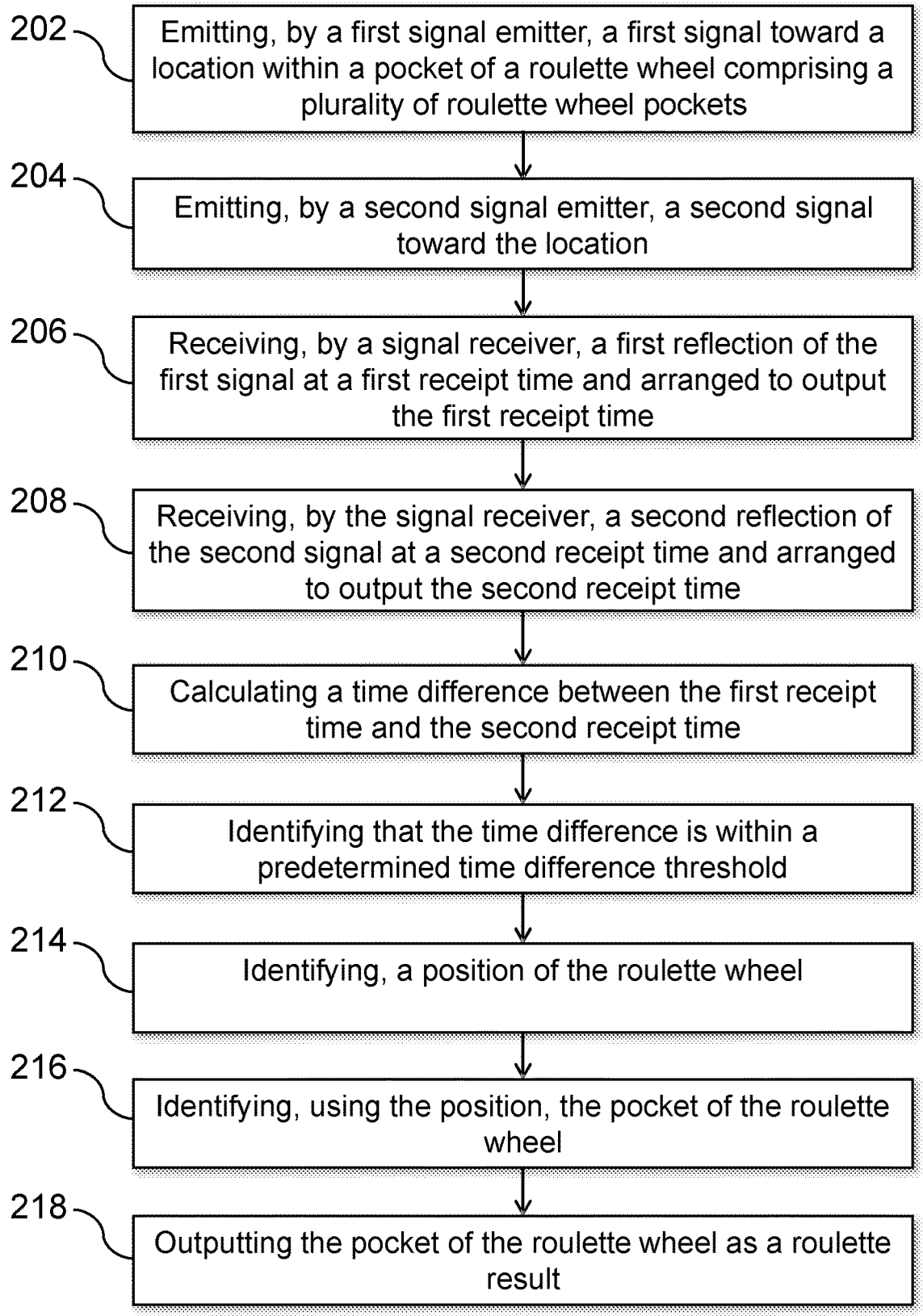
FIG. 3 shows a flow chart depicting steps in an example embodiment of a method of triangulating a roulette ball position in a pocket of a roulette wheel in accordance with the third aspect.

Referring to FIG. 3, an example embodiment of a method 200 of triangulating a roulette ball position in a pocket of a roulette wheel is shown in accordance with the third aspect, the method comprising the steps of:
emitting, by a first signal emitter, a first signal toward a location within a pocket of a roulette wheel comprising a plurality of roulette wheel pockets 202;
emitting, by a second signal emitter, a second signal toward the location 204;
receiving, by a signal receiver, a first reflection of the first signal at a first receipt time and arranged to output the first receipt time 206;
receiving, by the signal receiver, a second reflection of the second signal at a second receipt time and arranged to output the second receipt time 208;
calculating a time difference between the first receipt time and the second receipt time 210;
identifying that the time difference is within a predetermined time difference threshold;
identifying a position of the roulette wheel 212;
identifying, using the position, the pocket of the roulette wheel 214; and
outputting the pocket of the roulette wheel as a roulette result 216.

In the embodiment shown, the method 200 is performed by a roulette wheel reading apparatus 116 as shown in FIG. 1 and FIG. 2.

It will be appreciated that the above described embodiments are given by way of example only and that various modifications may be made to the described embodiments without departing from the scope of the invention as defined in the appended claims. For example, in the embodiment shown, the roulette wheel 100 is an automated roulette wheel. Embodiments of the present invention will be applicable to both automated and non-automated roulette wheels.

The invention claimed is:

1. A roulette wheel reading apparatus for triangulating a roulette ball position in a pocket of a roulette wheel, the apparatus comprising:
a triangulation sensor, a roulette wheel position sensor, and a processor;
wherein the triangulation sensor comprises:
a first signal emitter arranged to emit a first signal toward a location within the pocket of the roulette wheel comprising a plurality of roulette wheel pockets; and
a second signal emitter arranged to emit a second signal toward the location;
wherein the triangulation sensor further comprises:
a signal receiver positioned to receive a first reflection of the first signal at a first receipt time and arranged to output the first receipt time, the signal receiver being further positioned to receive a second reflection of the second signal at a second receipt time and arranged to output the second receipt time; wherein the first reflection and the second reflection originate from said roulette ball;
the roulette wheel position sensor being arranged to detect and output a position of one or more of the plurality of roulette wheel pockets relative to the location;
the processor being arranged to:
receive the first receipt time, the second receipt time and the position of the one or more of the plurality of roulette wheel pockets;
calculate a time difference between the first receipt time and the second receipt time;
identify that the time difference is within a predetermined time difference threshold;
identify, using the position of the one or more of the plurality of roulette wheel pockets, the pocket of the roulette wheel; and
output an identity of the pocket of the roulette wheel as a roulette result.

2. The roulette wheel reading apparatus as claimed in claim 1, wherein the apparatus further comprises:
a memory, and
wherein the processor is arranged to store on the memory at least one of: the first receipt time; the second receipt time; the position; the pocket as a roulette result.

3. The roulette wheel reading apparatus as claimed in claim 1, wherein the apparatus further comprises
a display screen in digital communication with the processor, and wherein the display screen is arranged to display an indication of the pocket as a roulette result.

4. The roulette wheel reading apparatus as claimed in claim 3, wherein the display screen is arranged to display a series of indications of previous roulette results.

5. The roulette wheel reading apparatus as claimed in claim 1, wherein the first signal emitter and the second signal emitter are arranged to emit a signal having a signal type selected from the group: acoustic; infrared; near infrared; ultraviolet; any suitable region of the electromagnet spectrum.

6. The roulette wheel reading apparatus as claimed in claim 5, wherein the signal receiver is arranged to receive a signal having the signal type.

7. The roulette wheel reading apparatus as claimed in claim 5, wherein the first signal emitter and the second signal emitter are optical emitters.

8. The roulette wheel reading apparatus as claimed in claim 1, wherein the first signal emitter is arranged to emit the first signal in a first direction toward the location, and wherein the second signal emitter is arranged to emit the second signal in a second direction toward the location, wherein the first direction and the second direction are different.

9. The roulette wheel reading apparatus as claimed in claim 8, wherein the first signal describes a first signal trajectory in the first direction, and wherein the second signal describes a second signal trajectory in the second direction, wherein the first signal trajectory and the second signal trajectory intersect to describe an angle therebetween, the angle being selected from the range: 00 to 900.

10. The roulette wheel reading apparatus as claimed in claim 9, wherein the angle is selected from the range: 50 to 250.

11. The roulette wheel reading apparatus as claimed in claim 1 wherein the first reflection describes a first reflection trajectory toward the signal receiver, and the second reflection describes a second reflection trajectory toward the signal receiver, wherein the first reflection trajectory and the second reflection trajectory are coincident.

12. The roulette wheel reading apparatus as claimed in claim 1, wherein the apparatus further comprises one or more additional signal emitters, each of the additional signal emitters being arranged to emit a corresponding additional signal toward the location.

13. The roulette wheel reading apparatus as claimed in claim 12, wherein the signal receiver is arranged to receive a corresponding reflection of each additional signal at a corresponding receipt time.

14. The roulette wheel reading apparatus as claimed in claim 13, wherein said corresponding reflection originates from the roulette ball.

15. A roulette wheel comprising a roulette wheel bowl and a roulette wheel wheelhead, the roulette wheel further comprising the roulette wheel reading apparatus of claim 1.

* * * * *